(12) United States Patent
Dong et al.

(10) Patent No.: US 12,277,788 B2
(45) Date of Patent: Apr. 15, 2025

(54) CONTENT EXTRACTION BASED ON HOP DISTANCE WITHIN A GRAPH MODEL

(71) Applicant: PAYPAL, INC., San Jose, CA (US)

(72) Inventors: Yanfei Dong, Singapore (SG); Yuan Deng, Singapore (SG); Jiazheng Zhang, Singapore (SG); Francesco Gelli, Singapore (SG); Ting Lin, Singapore (SG); Yuzhen Zhuo, Singapore (SG); Hewen Wang, Singapore (SG); Soujanya Poria, Singapore (SG)

(73) Assignee: PayPal, Inc., San Jose, CA (US)

( * ) Notice: Subject to any disclaimer, the term of this patent is extended or adjusted under 35 U.S.C. 154(b) by 338 days.

(21) Appl. No.: 17/983,908

(22) Filed: Nov. 9, 2022

(65) Prior Publication Data
US 2024/0153296 A1    May 9, 2024

(51) Int. Cl.
*G06V 30/19*        (2022.01)
*G06V 10/74*        (2022.01)
*G06V 30/18*        (2022.01)
*G06V 30/414*       (2022.01)

(52) U.S. Cl.
CPC ........ *G06V 30/1916* (2022.01); *G06V 10/761* (2022.01); *G06V 30/18181* (2022.01); *G06V 30/414* (2022.01)

(58) Field of Classification Search
CPC .................................................. G06V 10/761
See application file for complete search history.

(56) References Cited

U.S. PATENT DOCUMENTS

| | | | |
|---|---|---|---|
| 2014/0324904 A1* | 10/2014 | Yamamoto | G06F 30/00 707/769 |
| 2022/0028557 A1* | 1/2022 | Klasson | G16H 50/20 |
| 2023/0282016 A1* | 9/2023 | He | G06N 7/01 382/159 |
| 2023/0368553 A1* | 11/2023 | Jha | G06V 30/412 |
| 2024/0153296 A1* | 5/2024 | Dong | G06V 30/18181 |

* cited by examiner

*Primary Examiner* — Edward Park
(74) *Attorney, Agent, or Firm* — Greenberg Traurig, LLP

(57) ABSTRACT

A method of categorizing text entries on a document can include determining, for each of a plurality of text bounding boxes in the document, respective text, respective coordinates, and respective input embeddings. The method may further include defining a graph of the plurality of bounding boxes, the graph comprising a plurality of connections among the plurality of bounding boxes, each connection comprising a first and second bounding box and zero or more respective intermediate bounding boxes. The method may further include determining a respective attention value for each connection according to a quantity of intermediate bounding boxes in the connection and, based on the respective attention values and a transformer-based machine learning model applied to the respective input embeddings and respective coordinates, determining output embeddings for each bounding box and, based on the respective output embeddings, generating a bounding box label for each bounding box.

20 Claims, 7 Drawing Sheets

CONTENT EXTRACTION BASED ON HOP DISTANCE WITHIN A GRAPH MODEL

TECHNICAL FIELD

This disclosure relates to automated classification of text portions on a document, as well as automated classifications of other information and data that can be represented in a relationship graph.

BACKGROUND

Structured document information extraction has practical applications in receipt digitization, workflow automation, and identity verification, among others. It is a challenging task that involves processing documents of diverse templates and complex spatial structures, with strict requirements for extraction accuracy and inference time.

DETAILED DESCRIPTION

Figure 1:
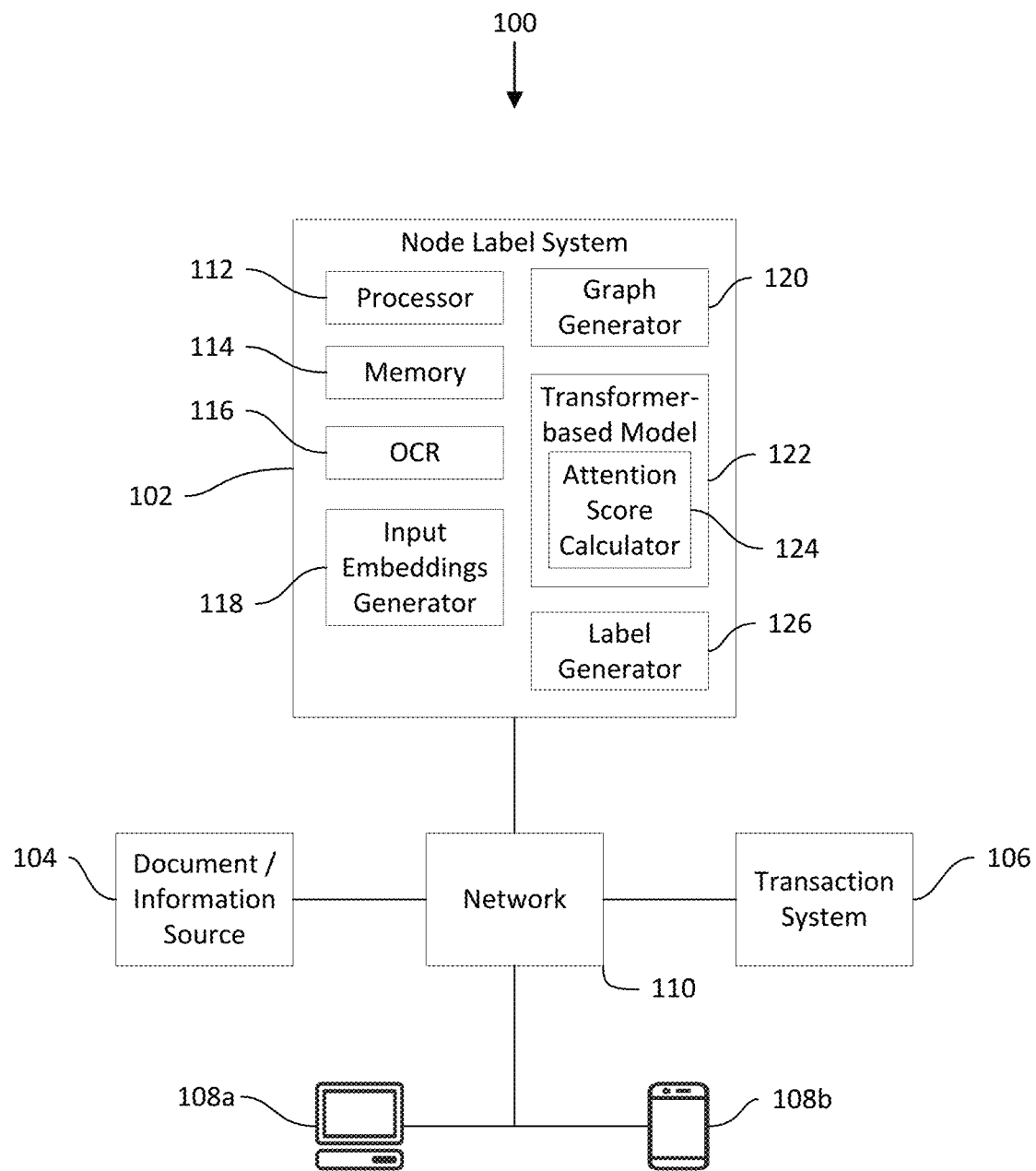
FIG. 1 is a block diagram view of an example system for automatically categorizing text in a document.

Existing methods for processing documents with complex layouts may utilize layout information, such as position or relative distance, with transformer-based models. Various methods may use absolute positions and pair-wise relative Euclidean distance to build layout features. Experiments show that spatial modelling is a key contributing factor to the success of these methods. However, these methods may only consider relative Euclidean distance. They do not integrate other forms of pairwise entity relationships, such as spatial information including K-Nearest Neighbor (KNN) based information or quantized relative distance information. These forms of spatial information can improve understanding of entity relationships. For example, two document entity pairs could carry different importance despite having the same position and distance, due to the presence or absence of other entities positioned between the pairs. Spatial information can be better leveraged for document entity classification.

The instant disclosure includes a new form of attention mechanism, disentangled attention, to integrate useful spatial information. Instead of using one vector to represent an entity's content and positional embedding, the instant disclosure includes the use of multiple vectors to encode different forms of pair-wise spatial information, such as pair-wise relative distance, pair-wise KNN hop distance, and/or pair-wise quantized relative distance, in embodiments. Disentangled vectors may better capture an entity's importance because an entity's attention weight depends not only on its own absolute positional and content information, but also on its various forms of relative spatial positions. Experiments have shown that entity (e.g., text portion) classification according to the present disclosure outperforms known methods.

The instant disclosure includes a light-weight transformer-based model that extracts information from structured documents with combinatorial constraints. For example, a new form of pair-wise entity relationship-based inductive bias, KNN Hop Attention, which may be constructed from the document entities, may be integrated directly into the attention mechanism. For entity pairs with the same Euclidean distance but different hop distances, the difference in hop distance would contribute to different attention weights. The way in which the hop attention may be constructed and applied can be applied to many other forms of pair-wise entity relationships, including data sets that can be reduced to a relationship graph.

To improve computational efficiency, an entity's attention calculation may be limited to only to its local radius of neighborhood, in some embodiments. This limitation may also strengthen the inductive bias of the attention mechanism.

Classifying entities according to the present disclosure may offer many technological improvements to the executing computing system. For example, initialized parameters of existing language models are not required, which makes models according to the present disclosure highly parameter efficient (in some embodiments, on the order of 100 times smaller than known models in terms of trainable parameters). This parameter efficiency contributes to faster fine-tuning and makes mobile deployment feasible. In addition, it offers particular benefits in practical applications with low latency requirements, such as real-time user identity verification.

FIG. 1 is a block diagram view of an example system 100 for automatically categorizing text in a document. The system 100 may include a node labelling system 102, a document/information source 104, a transaction system 106, and one or more user computing devices 108a, 108b (which may be referred to collectively as user computing devices 108 or individually as a user computing device 108) in communication with one another over a network 110.

The node labelling system 102 may include a processor 112 and a non-transitory, computer-readable memory 114 or other medium storing instructions that, when executed by the processor 112, cause the node labelling system 102 to perform one or more operations, steps, methods, algorithms, processes, etc. of this disclosure.

Generally, the node labelling system 102 may be configured to, given an input data set that can be reduced to a connected relationship graph (e.g., such as the graphs shown in FIGS. 3, 6, and 7), assign one or more categorization labels to that data set, such as labels categorizing individual data points within that data set, labels categorizing the entire data set, and/or labels categorizing sub-parts within that data set (e.g., sub-graphs). The present disclosure will discuss embodiments in which the input data set is a document (e.g., an electronic image of a document), and the node labelling system 102 is utilized to automatically label text portions of the document. However, such embodiments are illustrative only. The node labelling system 102 may find use with many other types of data sets, including but not limited to additional data set types described herein.

The node labelling system may include one or more functional modules 116, 118, 120, 122, 124, 126 embodied in hardware and/or software for carrying out its various functions. In some embodiments, one or more of the functional modules 116, 118, 120, 122, 124, 126 may be embodied as instructions in the memory 114.

The node labelling system 102 may include an optical character recognition (OCR) module 116 that may receive, as input, a document (e.g., electronic image of the document), and may identify text portions of the document, may define bounding boxes around respective text portions of the document, and may identify individual characters of text in each text portion. The OCR module may further define positional information of each text box, such as coordinates relative to the page and/or relative to other text boxes, sizes of the bounding boxes, etc., in some embodiments. The OCR module 116 may output the defined and identified bounding boxes, text, and positional information for further processing.

In some embodiments, the OCR module 116 may generate a bounding box for each group of characters identified on the document. Each bounding box may be an imaginary boundary that encloses the text (e.g., the characters) determined to be within the same group on the document (such a group may be referred to herein as a "text portion"). Each bounding box may have a pre-defined shape (e.g., a rectangle, an oval, etc.) and may be defined by the width and height of the text within the group.

The OCR module 116 may then analyze each of the bounding boxes within the image, and may determine features for each of the bounding boxes. In some embodiments, the features determined for each bounding box may include a location of the bounding box within the document (e.g., one or more pixel locations of pixels corresponding to the bounding box, such as one or more corners of the bounding box, a center of the bounding box, etc.), and characteristics of the texts enclosed within the bounding box, such as a font type, a font size, a font color, a spacing between characters in the bounding box, and other text characteristics. Along with the OCR module 116, additional text preprocessing that may be performed by the node label system 102 may include determining a size of the bounding box (e.g., the dimensions of the bounding box, a pixel count of the bounding box, etc.) and determining one or more distances between one or more neighboring bounding boxes.

Figure 2:
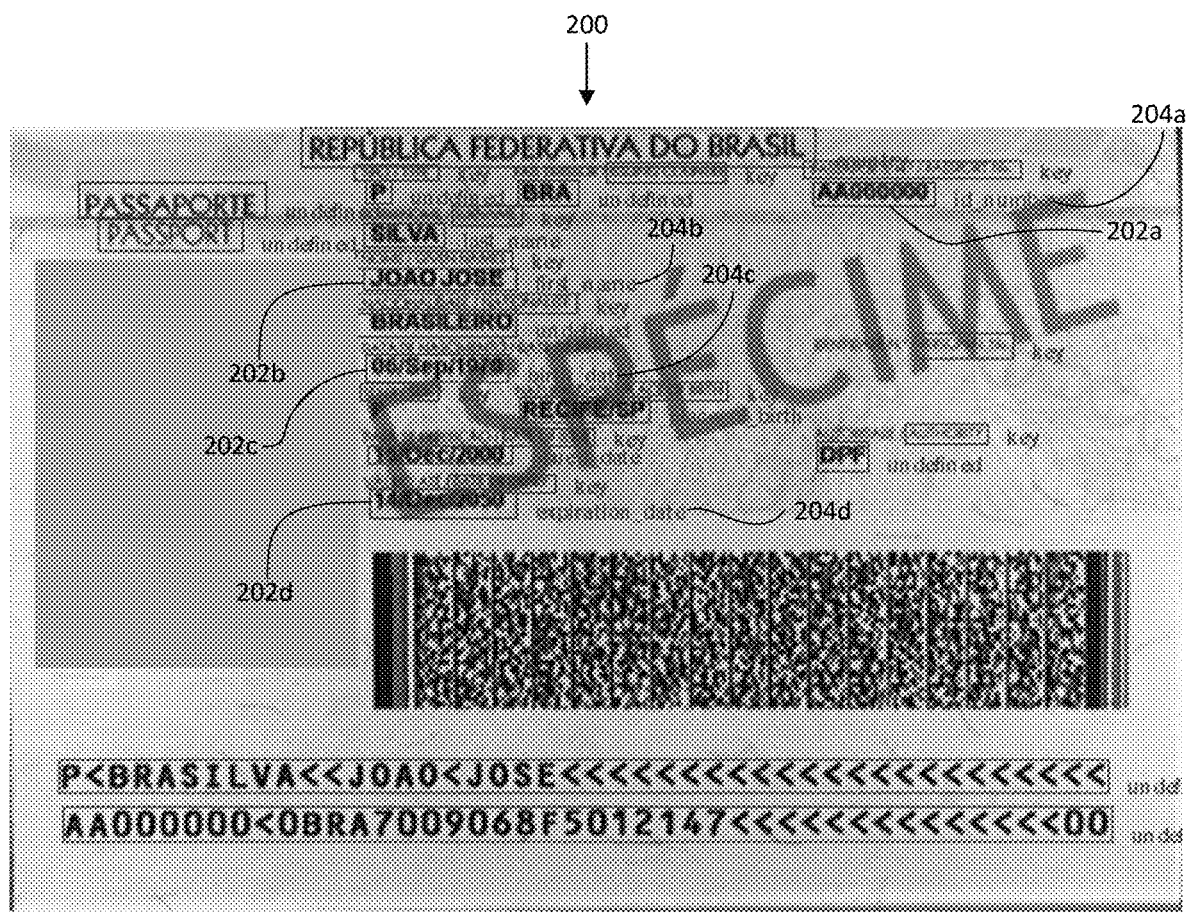
FIG. 2 illustrates example bounding boxes on an example document.

FIG. 2 illustrates example bounding boxes 202 on an example document 200. Four bounding boxes 202a, 202b, 202c, and 202d are indicated, though the document 200 includes many more text portions and bounding boxes. The OCR module 116 may define a bounding box around a contiguous text portion, i.e., a text portion with a continuous set of characters that is offset from other characters by a certain amount of whitespace.

Referring again to FIG. 1, node labelling system 102 may include an input embeddings generator module 118 that may receive, as input, the characters of each of one or more text portions (e.g., each text portion identified by the OCR module 116) and may generate, for each text portion, an embeddings vector representative of that series of characters. The input embeddings generator module 118 may be or may include a sentence transformer, in some embodiments, and/or one or more additional embeddings generators. Each embeddings vector may be an m-dimensional vector that is representative of a text portion. For example, the sentence transformer may generate a first embedding vector representative of the text content of a text portion. A second embedding generator may generate a second embedding vector representative of the size of the bounding box of the text portion. In addition, the embeddings vectors serve as representations of the text portions and of the size of the bounding box of the text portion that are understandable to further machine learning processes, as described below.

The node labelling system 102 may further include a graph generator module 120 that may receive, as input, positional information respective of each of a plurality of bounding boxes (e.g., the positional information identified or defined by the OCR module 116) and may generate a relationship graph representative of the plurality of bounding boxes. In the graph, each bounding box may be represented as a node. The relationship graph may be generated according to a K-Nearest-Neighbors (KNN) approach, in some embodiments, in which each bounding box node is directly connected to the k nearest neighbors of that bounding box on the document, as determined according to the positional information, with k being a defined integer. In some embodiments, "nearest" may be determined according to distances between centers of bounding boxes. Alternatively, "nearest" may be determined according to distances between edges of bounding boxes, or according to some other measurement.

In some embodiments, the graph generator module 120 may determine node-to-node connections according to an approach other than nearest neighbors. For example, the graph generator module 120 may connect bounding box nodes for which a straight line can be drawn from one bounding box to another, without passing through any other bounding box.

Figure 3:
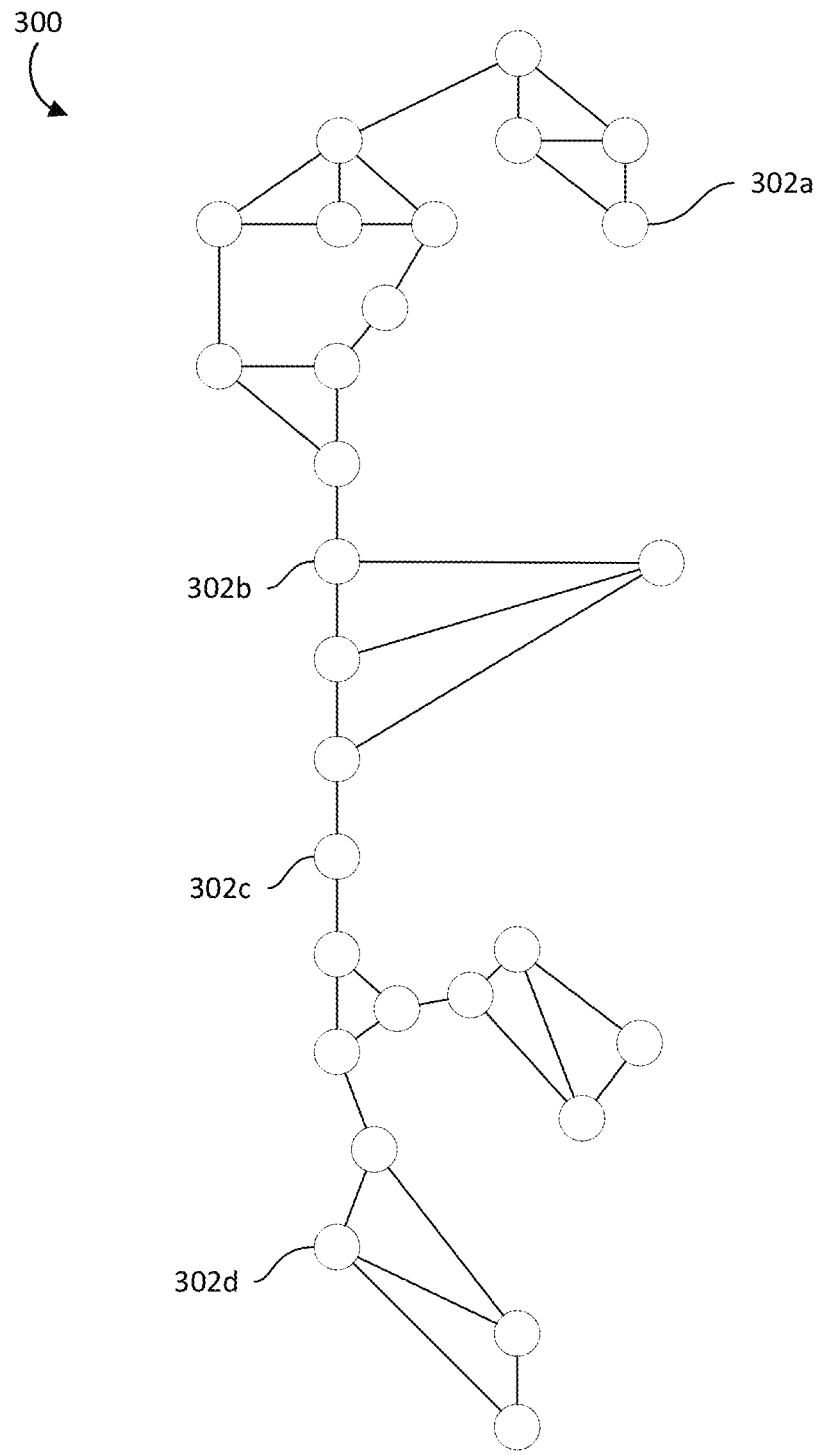
FIG. 3 illustrates an example graph of a plurality of bounding boxes on a document.

FIG. 3 illustrates an example graph 300, representative of the bounding boxes on the document 200. The graph 300 includes a plurality of nodes 302 (four such nodes 302a, 302b, 302c, and 302d are indicated, which correspond to bounding boxes 202a, 202b, 202c, and 202d, respectively) having direct and indirect connections between nodes. Each indirect connection between two nodes may include one or more intermediate nodes. Each direct connection may include an edge between two nodes, with no intermediate nodes. For example, the connection between node 302a and node 302b is a direct connection. Connected nodes may be separated by a "hop distance", defined by the quantity of intermediate nodes in the connection, or by how many direct connections or edges must be traversed from one node to the other. For example, the connection between node 302a and node 302b has a hop distance of seven (7), the connection between node 302a and node 302c has a hop distance of ten (10), and the connection node 302a and node 302d has a hop distance of fourteen (14). The connection between node 302b and node 302c has a hop distance of three (3). The connection between node 302c and node 302d has a hop distance of four (4). The hop distance between two nodes may be determined according to the shortest path (in terms of intermediate nodes) between those nodes, in some embodiments.

Referring again to FIG. 1, the node labelling system 102 may further include a transformer-based model module 122 that receives, as input, a graph, input embeddings respective of each text portion, and positional information respective of each bounding box. The transformer-based model module 122 may output a respective output embeddings vector representative of each bounding box. The transformer-based model module 122 may determine attention scores for one or more node connections within the graph of the bounding boxes, which attention scores are used in the determination of the output embeddings vectors. Accordingly, the transformer-based model module 122 may further include an attention score determination module 124 that receives, as input, information respective of the nodes of a graph (e.g., information respective of bounding boxes from which a graph has been generated) and outputs node-to-node attention score values (e.g., pairwise self-attention values) respective of one or more of the plurality of connections in the graph. The attention values may be used by the transformer-based model module 122 to determine labels respective of the graph, as described below. Attention values may be determined for both direct and indirect connections.

It should be noted that, although the attention score determination module 124 is described herein as a sub-module of the transformer-based model module 122, the functionality of the attention score determination module 124 may be included in the transformer-based model of the transformer-based model module 122, in some embodiments.

In some embodiments, the attention score for a given connection between two nodes may be determined according to the hop distance between those nodes, and thus according to the quantity of intermediate nodes between those two nodes. For example, an attention score $a_{i,j}$ between nodes i and j may be calculated at each of a plurality of layers of the transformer-based model according to equations (1)-(2) below:

$$a_{i,j} = \frac{\exp(e_{i,j})}{\sum_k \exp(e_{i,k})} \qquad \text{Eq. (1)}$$

$$e_{i,j} = \left[x_i W^Q \left(x_j W^K + H_{\Phi_{i,j}}^Q + R_{\sigma_{i,j}}^Q\right) + x_i W^K \left(H_{\Phi_{i,j}}^K + R_{\sigma_{i,j}}^K\right)\right] / \sqrt{d} \qquad \text{Eq. (2)}$$

where $e_{i,j}$ is a vector from node i to node j, $\sigma_{i,j}$ is a concatenation of the relative Euclidean distance and angle between node i and node j, R is a learnable matrix, H is a learnable matrix or lookup table that maps $\sigma_{i,j}$ to learnable embeddings, and W is also a learnable matrix. $x_i$ is, at a first layer of the model, the embeddings vector associated with node I. At subsequent layers of the model, $x_i$ is the output $z_i$ for node I from the previous layer of the model. The training of matrix H may be guided by the pairwise hop distances between nodes. The product between $x_iW^Q$ and $H_{\Phi_{i,j}}^Q$ represents interactions from textual content to hop distance (text-to-hop), and the product between $x_iW^K$ and $H_{\Phi_{i,j}}^K$ represents interactions from hop distance to textual content (hop-to-text).

The above attention score calculation may account for numerous interactions from one node to another, and/or from one node to information respective of a node-to-node connection. Each attention score may accounts for the relationship from the content of the node to the content of the connected node (via $x_iW^Q x_jW^K$), the relationship from the content of the node to the structural relationship between the two nodes (via $x_iW^Q H_{\Phi_{i,j}}^Q$), the content of the node to the Euclidean distance between the nodes (via $x_iW^Q R_{\sigma_{i,j}}^Q$), the structural relationship between the two nodes to the content of the node (via $x_iW^K H_{\Phi_{i,j}}^K$), and the Euclidean distance between the nodes to the content of the node (via $x_iW^K R_{\sigma_{i,j}}^K$).

The attention scores calculated by the attention score calculator module 122, including the broad array of information that may be accounted for in the attention scores, may enable more accurate label predictions and classifications of nodes, sub-graphs, and/or of the graph itself relative to known approaches. In particular, such attention scores may enable more accurate labelling and predictions with respect to documents and other graphable data sets that do not match a known template or format.

In some embodiments, the computational efficiency of the attention score calculator module 122 may be improved by reducing the set of attention scores to be calculated for a given graph. For example, attention scores may be calculated only for connections having up to a maximum threshold of hop distance. The threshold may be set before the attention score calculator module 122 calculates the attention scores, and thus may be predetermined. In another example, attention scores may be calculated only for connections between bounding boxes having less than a maximum Euclidean distance separation, less than a maximum quantized relative distance, or some other positional or graph relationship. Attention scores for connections that do not meet the threshold (e.g., having a hop distance greater than the threshold) may be set to zero instead of being calculated.

In some embodiments, in addition to or instead of hop distance, attention scores may be calculated according to other positional information respective of two connected nodes (e.g., bounding boxes), such as Euclidean distance, angle, or quantized Euclidean distance.

The transformer-based model may calculate, at each of its plurality of layers, an output embeddings vector $z_i$ respective of node i according to equation (3) below:

$$z_i = \Sigma_j a_{i,j} (x_j W^V + H_{\Phi_{i,j}}^V + R_{\sigma_{i,j}}^V) \qquad \text{Eq. (3)}$$

The node labelling system 102 may further include a label generator module 126 that receives, as input, embeddings respective of a plurality of nodes of a graph (e.g., the output embeddings calculated by the transfer-based model module 124) and outputs one or more labels respective of the graph. In some embodiments, the label generator module 126 may output a respective label for each node of the graph. In some embodiments, the label generator module 126 may output a label for the graph in its entirety. In some embodiments, the label generator module 126 may output a respective label for each of one or more sub-graphs within the graph (e.g., with each sub-graph including a respective plurality of nodes and/or connections of less than the full graph). In the example of FIG. 2, a plurality of labels 204a, 204b, 204c, 204d are shown in connection with the bounding boxes 202a, 202a, 202c, 202d, which labels were generated by the label generator module 126.

Referring again to FIG. 1, the label generator module 126 may select labels for bounding boxes or other nodes from a predetermined list of labels. For example, as described below, the label generator module may perform combinatorial matching between the predetermined label list and the nodes. Alternatively, the label generator module 126 may select one or more labels for each node from the predetermined label set along with a prediction confidence or other ranking value.

The label generator module 126 may be or may include a postprocessing component that performs combinatorial matching according to equation (4) below:

$$\tau_{opt} = \text{argmin}_\tau \Sigma_i^N L_{match}(y_i^{label}, y_{\tau_i}^{pred}) \qquad \text{Eq. (4)}$$

where $\tau$ is an assigned label and $L_{match}$ is the matching cost of a possible label $y_i^{label}$ and a predicted label $y_{\tau_i}^{pred}$. In some embodiments, for example, the label generator module 126 may perform combinatorial matching. Combinatorial matching may find particular use in embodiments in which the node labelling system 102 is used with documents with 1-to-1 label-to-text portion relationships, where one field category corresponds to only one entity. For other documents, the label generator module 126 may be or may include a multilayer perception neural network that outputs one or more predicted labels for each text portion, and the highest-likelihood prediction may be selected for each text portion.

The document/information source 104 may be or may include one or more sources of documents, or other data sets, from which a graph may be generated and one or more labels may be generated by the node labelling system 102. The document/information source may be one or more users (e.g., through one or more user computing devices 108, such as a camera or other image capture device of the user computing devices 108), one or more websites, one or more databases, etc. Thus, in embodiments, the node labelling system 102 may receive a data set from a document/information source 104, extract text and labels (or otherwise label and classify) from the data set, and initiate use of the labels as discussed herein. In some embodiments, the node labelling system 102 may transmit the labels back to the document/information source 104 from which the data set was received.

The transaction system 106 may be or may include one or more systems or sub-systems involved in executing an electronic transaction. For example, the transaction system 106 may be or may include a payment processor, a fraud detection system, a point-of-sale system, etc. The transaction system 106 may receive information from the node labelling system 102 related to a transaction. In response to the received information, the transaction system 106 may perform an action related to the transaction, such as completing the transaction, declining the transaction, requesting further information from an entity involved in the transaction, validating a user involved in the transaction, etc. Further, the node labelling system 102 may transmit labels or other extracted information to a transaction system 106 to initiate, complete, or cancel a transaction, or to otherwise assist the transaction system 106 in conducting one or more transactions.

The node labelling system 102 may find use in many contexts and applications. For example, the node labelling system may be used to extract information from one or more documents (e.g., tax forms, identification documents, information requests such as subpoenas, proof-of-address or other proof documents, etc.), so that the extracted information may be used to verify users, build user profiles, conduct electronic transactions, retrieve pertinent information, etc. In such examples, the labels generated may identify the content type of each text portion of the document, for example.

In a particular example, a document may be a user identification document. Information may be automatically extracted from the identification document and compared to a user profile and, if the information matches, the user may be verified. The user profile may be stored and provided by a transaction system 106, for example. Automated content identification for use in user verification may improve upon known approaches to this task, which generally rely upon comparing identification documents to template documents. The teachings of the present disclosure may improve upon such known approaches especially with respect to documents without known templates or that do not follow a regular template. Further, the teachings of the present disclosure may enable such document-based user verification to be performed efficiently and rapidly on a frontend computing device.

In another example, the node labelling system 102 may be used in connection with automated receipt and invoice processing. In such an example, the node labelling system may automatically identify the amount, explanation, justification, etc. of each expense or cost and may classify those costs for simplified processing and categorization. Further, text extraction and labelling may be performed on a frontend device, and the extracted text and labels transmitted to backend storage or backend processing rather than transmitting to the entire document image, reducing the cost (in terms of both data volume and time) of transmission associated with each document.

In another example, the document may be a shipping label. In order to verify and check the shipment status of the shipment associated with the label, node labelling system 102 may extract and classify a tracking number of the shipment. A payment service provider system associated with the node labelling system 102 may then access a third-party server (e.g., a shipping courier server) using an application programming interface (API) call associated with the third-party server to determine a shipment status of the shipment based on the tracking number. In some embodiments, the payment service provider system may determine which third-party server (e.g., selecting a shipping courier server from multiple different shipping courier servers corresponding to different shipping couriers) to track the shipment status based on a format (e.g., an alpha-numeric arrangement) of the tracking number.

The node labelling system 102 may be implemented in a backend environment, in some embodiments. Additionally or alternatively, the node labelling system may be implemented on a frontend device, such as a user computing device 108. For example, the node labelling system 102 may be implemented on a user computing device 108 for use in connection with a point-of-sale system executing on the user computing device 108 to, e.g., verify a user's right to use a particular account in connection with a transaction. In another example, the node labelling system 102 may be implemented on a user computing device 108 which may be used to take photographs of documents, extract text and associated labels, and use the extracted text and labels to conduct a transaction (e.g., to fill in information respective of a transacting entity). Additionally or alternatively, the extracted text and labels may be transmitted for storage or further use, resulting in a reduced data load in the transmission relative to transmitting the entire document image. As noted above, the attention scores used and calculated according to the present disclosure enables a less complex classification model relative to known approaches, enabling efficient frontend implementation, including computational efficiency and execution speed.

Figure 4:
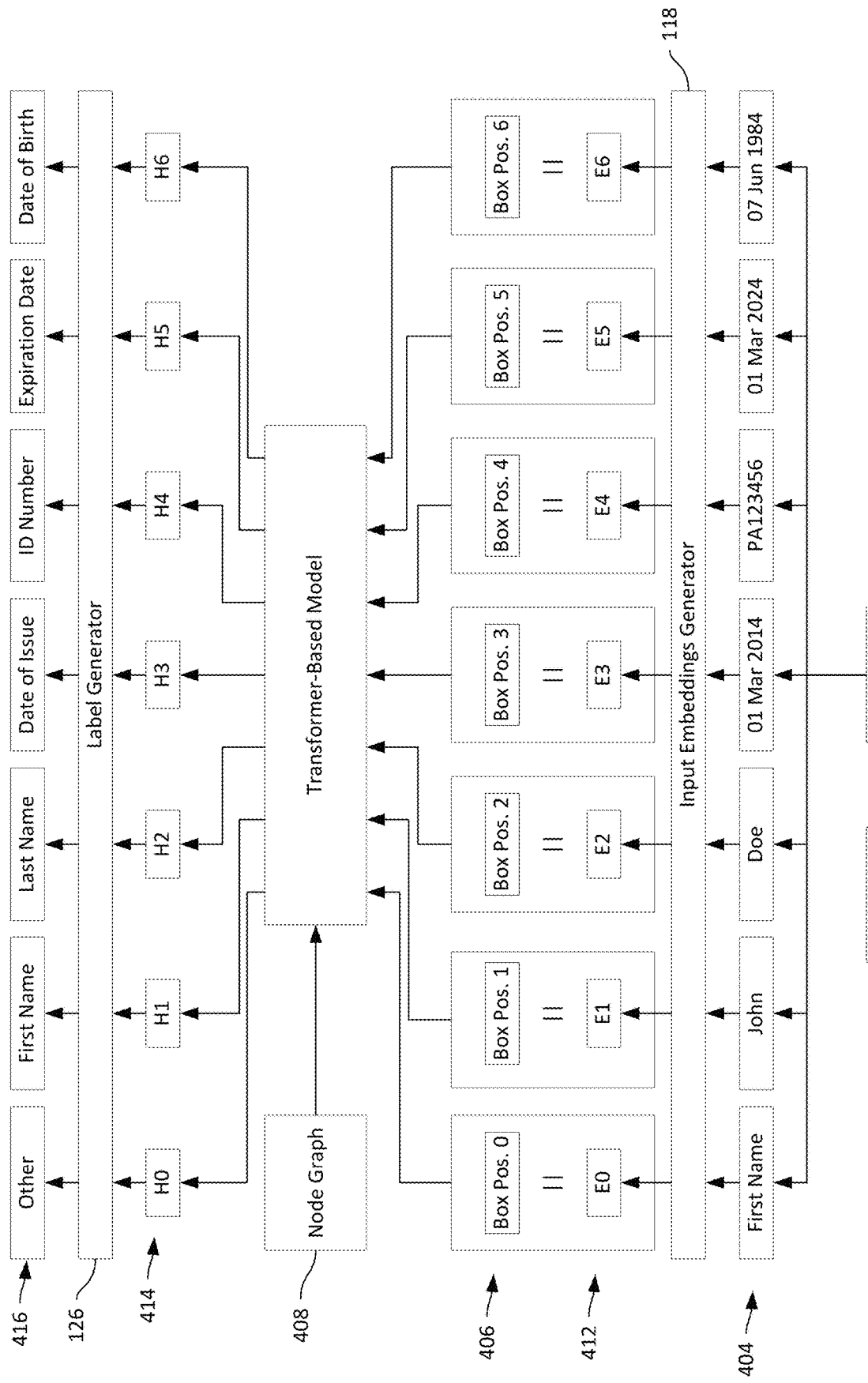
FIG. 4 is a block diagram and flow chart view of an example document text labelling system.

FIG. 4 is a block diagram and flow chart view of an example document text labelling system 400. The text labelling system includes an embodiment of the node labelling system 102.

Referring to FIG. 4, a document 402 may be input to the OCR module 116, which may identify a plurality of text portions on the document, define a respective bounding box for each document, determine the text content (e.g., a string of characters) 404 for each text portion, and define positional information 406 (Box Pos. 0, Box Pos. 1, . . . Box Pos. 6) for each bounding box.

A node graph 408 may be generated from the bounding box positional information 406, and a set of node-to-node attention weights 410 may be calculated from the bounding box positional information 406 and the text content 404. The input embeddings generator module 118 may calculate respective input embeddings 412 (E0, E1, . . . E6) for each bounding box representative of the text content of that bounding box.

The transformer-based model module 124 may receive the bounding box positional information 406, graph 408, and input embeddings 412 and may generate output embeddings vectors 414 (H0, H1, . . . H6) respective of each bounding box. In the course of generating the output embeddings vectors 414, the transformer-based model module 124 may determine node-to-node attention weights, as described above. The output embeddings vectors 414 may be input to the label generator module 126, which may output a label 416 respective of each node in the graph 408, and thus of each bounding box.

In some embodiments, the input embeddings generator module 118, transformer-based model 122 (including attention score determination module 124, shown in FIG. 1), and/or label generator module 126 may be trained (e.g., as individual model portions or as an end-to-end model) using labelled classifications of text portions of documents.

Figure 5:
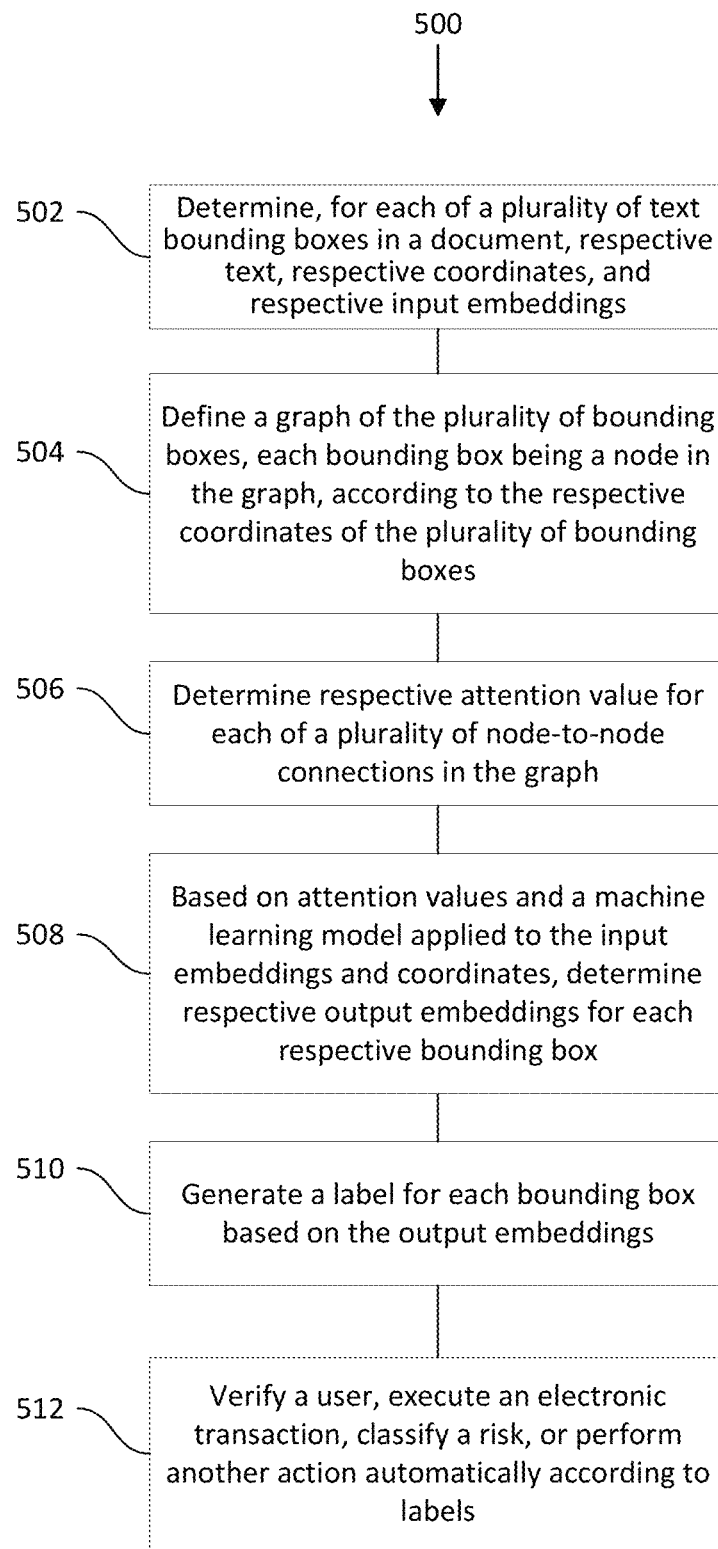
FIG. 5 is a flow chart illustrating an example method of determining categories of text on a document.

FIG. 5 is a flow chart illustrating an example method of determining categories of text on a document. The method 500, or one or more portions of the method 500, may be performed by the node label system 102 of FIG. 1, in some embodiments.

The method 500 may include, at block 502, determining, for each of a plurality of text bounding boxes in a document, respective text, respective coordinates, and respective input embeddings. Block 502 may include, for example, applying an OCR process to the document, which OCR process may output the characters of each text portion, coordinates and/or other positional information respective of each text portion, and a defined bounding box respective of each text portion. Block 502 may further include, for example, applying a sentence transformer to the content of each text portion to generate the respective input embeddings vector for each text portion.

The method 500 may further include, at block 504, defining, generating, or determining a graph of the plurality of bounding boxes, each bounding box being a node in the graph, according to the respective coordinates of the plurality of bounding boxes. Block 504 may include, for example, applying a K-Nearest-Neighbors algorithm to the nodes according to the coordinates (or other positional information) determined at block 502. Block 504 may also include selecting a value of K for the nearest neighbors algorithm, in some embodiments, which may determine the quantity of direct connections assigned to each node. Block 504 may include defining edges between directly connected nodes, for example.

The method 500 may further include, at block 506, determining a respective attention value for each of a plurality of node-to-node connections in the graph. Attention values may be determined for both direct connections (e.g., between nodes having a single edge connecting them) and indirect connections (e.g., between nodes having more than two edges and at least one intermediate node between them). In some embodiments, an attention value for a node-to-node connection may be calculated based on one or more of hop distance, Euclidean distance, angle, and/or text information respective of the connected nodes. The attention values may represent weights of the strength of relationship between nodes, which weights may be used to predict the labels for the text portions of the document.

The method 500 may further include, at block 508, based on a machine learning model applied to the input embeddings and coordinates determining respective output embeddings for each respective bounding box. Block 508 may include, for example, applying a transformer-based model to the input embeddings, coordinates, and attention values. In some embodiments, block 508 may further include applying the model to the graph itself. Further, in some embodiments, the attention value determinations at block 506 may be performed by (e.g., as a part of) the machine learning model applied at block 508.

The method 500 may further include, at block 510, generating a label for each bounding box based on the output embeddings. Block 510 may include, for example, applying a multi-layer perception (MLP) neural network to the output embeddings. combinatorial matching may be performed as postprocessing in embodiments in which the document is known to have 1-to-1 labelling (i.e., a single iteration of any given label). In other embodiments, the MLP network may make confidence-based or otherwise ranked predictions of the labels of each text portion, and the highest-confidence (or otherwise most highly-ranked) label may be selected as the label for each text portion bounding box.

The method 500 may further include, at block 512, verifying a user, executing an electronic transaction, classifying a risk, or performing another action automatically according to the generated labels. For example, where the document is an identification document, the content of text portions may be compared, based on the labels, to the equivalent content in a user profile or otherwise known about the user. If the information matches, then the user may be verified (e.g., to permit the user to access an electronic system, engage in a transaction, etc.) and/or a transaction associated with the user may be approved, executed, etc. In another example, where the document is a financial document, financial information may be extracted and categorized according to the labels applied to the financial entry text portions of the document. Such financial information may be used to create, revise, supplement, etc. an entity profile, for example, and may be used to classify or categorize a risk associated with the entity, such as a risk of processing transactions for or on behalf of the entity. In another example, for any type of document, extracted information may be used to populate a second document based on the labels associated with the extracted information (e.g., by matching labels between the document and the second document).

The approach described with respect to FIGS. 1-5, namely, generating a graph and input embeddings based on a data set, calculating pairwise attention values for the node-to-node connections in the graph, generating output embeddings for the graph based on the attention values (and, in some embodiments, input embeddings), and predicting a label or category for one or more portions of the graph (and therefore data set), has numerous applications. One particular application, described in detail herein, is in automated content extraction from a document. Other applications include, for example, risk classification of an entity (e.g., by mapping the entity's financial transactions, by mapping the entity relative to other entities, etc.), fraud detection (e.g., by mapping an entity's transactions), semantic image segmentation (e.g., by converting the image into a point cloud and mapping the point cloud), chemical compound detection or characterization (e.g., by mapping the atomic or molecular structure of the compound), etc.

Figure 6:
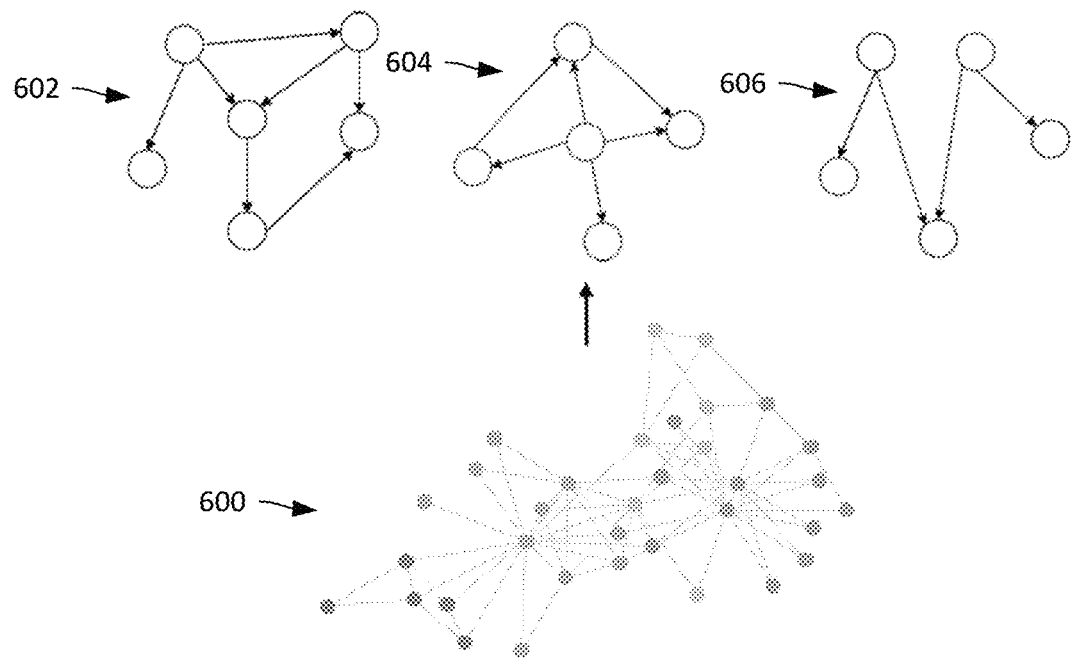
FIG. 6 illustrates an example graph, and a plurality of sub-graphs, of entity-to-entity connections from which categorization labels may be generated according to the teachings of the present disclosure.

FIG. 6 illustrates an example graph 600, and a plurality of sub-graphs 602, 604, 606, of entity-to-entity connections from which categorization labels may be generated according to the teachings of the present disclosure. For example, the graph 600 may represent a network of transacting entities (e.g., with an edge denoting two entities that have entered into a transaction together, or more than a threshold volume of transactions together). One or more sub-graphs 602, 604, 606 may be extracted from the graph 600. For example, connections within a given hop distance of a selected entity may be extracted as a sub-graph in order to classify that entity or to classify that entity's transaction community. Accordingly, each sub-graph may be representative of an entity or transaction community. Each sub-graph, and data respective of the entities represented by the nodes of that graph, may be input to a modified version of the node labelling system 400 to classify one or more individual entities in the sub-graph and/or to classify the entire sub-graph (e.g., a product community represented by the sub-graph). Such modifications may include, for example, calculating input embeddings respective of each entity, determining pairwise attention values based on entity characteristics, rather than text content, and training the label generator to select labels respective of a sub-graph, in addition to or instead of training the label generator to select labels respective of individual nodes, for example. Each node in each sub-graph, or the entire sub-graph, may thus be labelled or otherwise categorized to, e.g., classify a risk associated with one or more of the entities.

Figure 7:
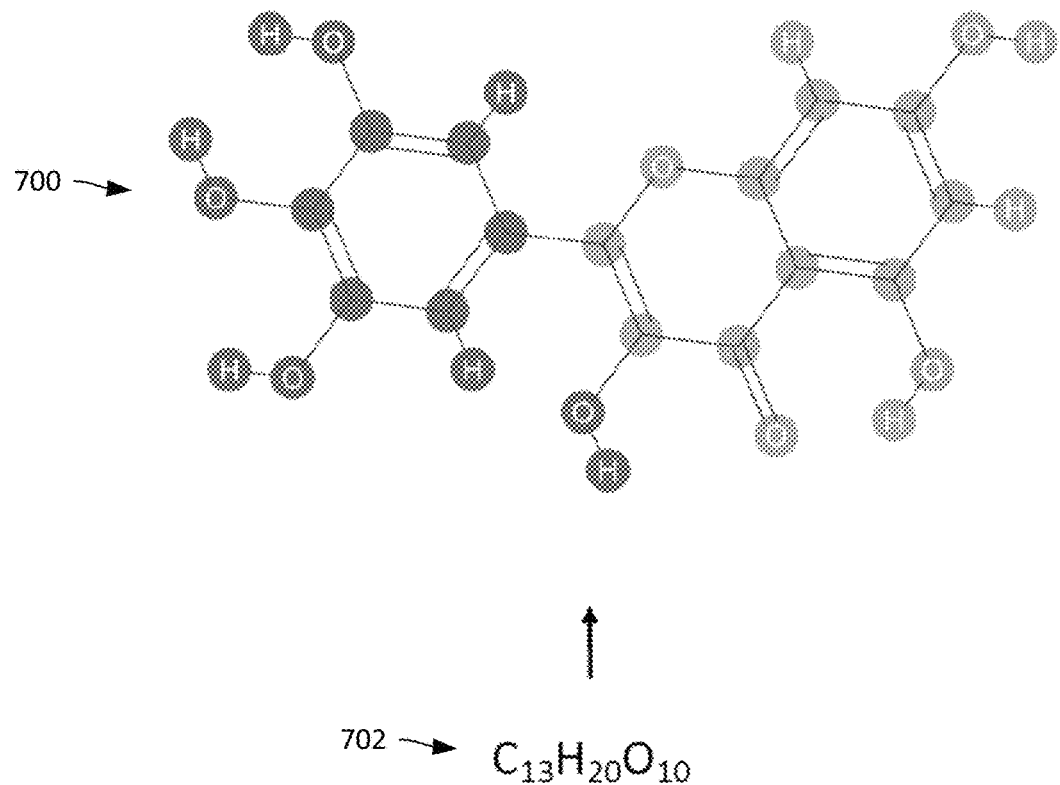
FIG. 7 is an example graph of a chemical molecule and a graph of connections with the molecule, from which compound categorization labels may be generated according to the teachings of the present disclosure.

FIG. 7 is an example graph 700 of a chemical molecule 702, from which compound categorization labels may be generated according to the teachings of the present disclosure. For example, the graph 700 may be input to a modified version of the node labelling system 400. Such modifications may include, for example, calculating input embeddings respective of each atom and determining pairwise attention values based on atomic characteristics, rather than text content, for example. The entire molecule may be labelled or classified, for example, in terms of characteristics, uses, etc.

Figure 8:
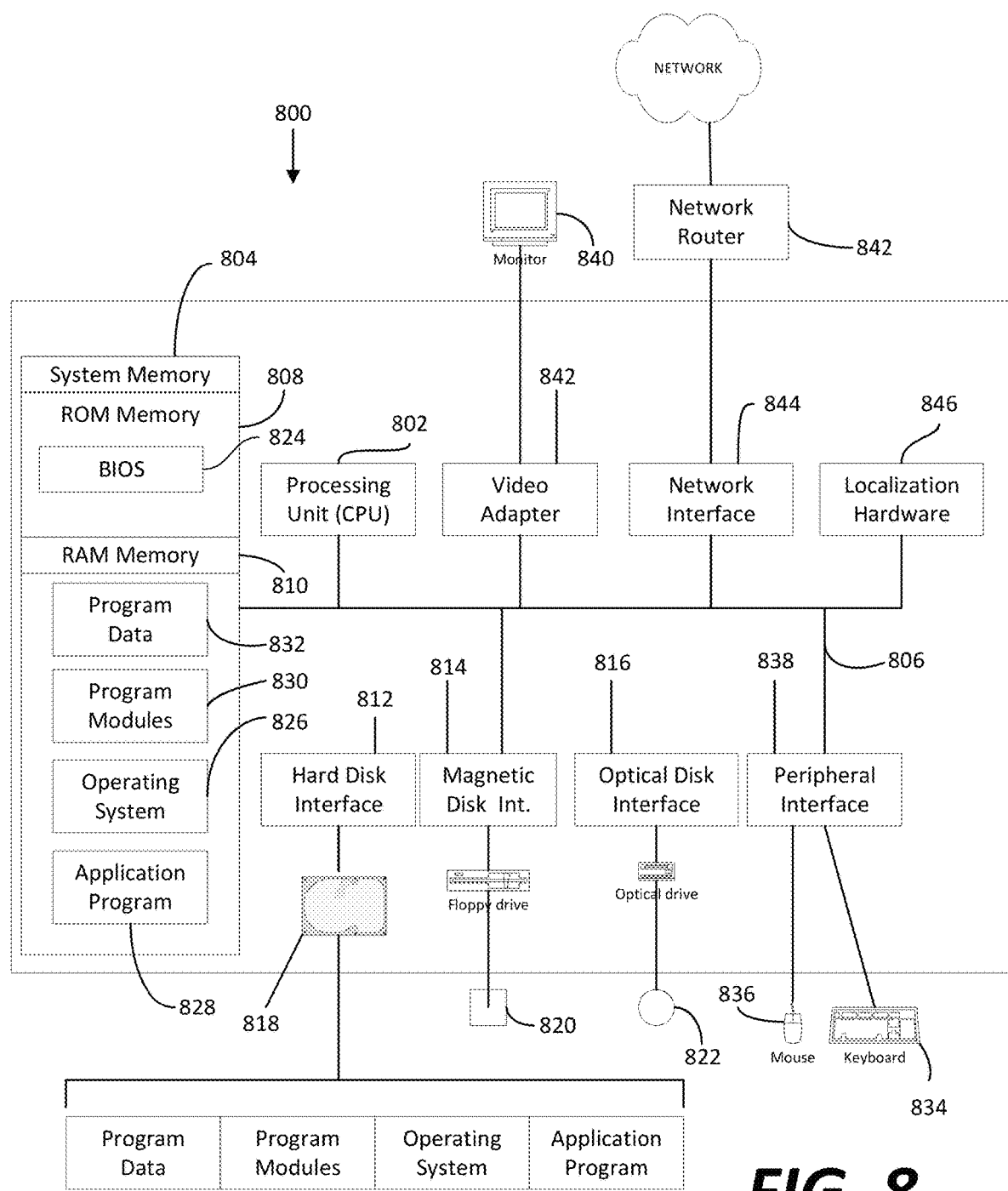
FIG. 8 is a block diagram of an example computing system.

FIG. 8 is a block diagram of an example computing system, such as a desktop computer, laptop, smartphone, tablet, or any other such device having the ability to execute instructions, such as those stored within a non-transient, computer-readable medium. Furthermore, while described and illustrated in the context of a single computing system 800, those skilled in the art will also appreciate that the various tasks described hereinafter may be practiced in a distributed environment having multiple computing systems 800 linked via a local or wide-area network in which the executable instructions may be associated with and/or executed by one or more of multiple computing systems 800.

In its most basic configuration, computing system environment 800 typically includes at least one processing unit 802 and at least one memory 804, which may be linked via a bus 806. Depending on the exact configuration and type of computing system environment, memory 804 may be volatile (such as RAM 810), non-volatile (such as ROM 808, flash memory, etc.) or some combination of the two. Computing system environment 800 may have additional features and/or functionality. For example, computing system environment 800 may also include additional storage (removable and/or non-removable) including, but not limited to, magnetic or optical disks, tape drives and/or flash drives. Such additional memory devices may be made accessible to the computing system environment 800 by means of, for example, a hard disk drive interface 812, a magnetic disk drive interface 814, and/or an optical disk drive interface 816. As will be understood, these devices, which would be linked to the system bus 806, respectively, allow for reading from and writing to a hard disk 818, reading from or writing to a removable magnetic disk 820, and/or for reading from or writing to a removable optical disk 822, such as a CD/DVD ROM or other optical media. The drive interfaces and their associated computer-readable media allow for the nonvolatile storage of computer readable instructions, data structures, program modules and other data for the computing system environment 800. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nanodrives, memory sticks, other read/write and/or read-only memories and/or any other method or technology for storage of information such as computer readable instructions, data structures, program modules or other data. Any such computer storage media may be part of computing system environment 800.

A number of program modules may be stored in one or more of the memory/media devices. For example, a basic input/output system (BIOS) 824, containing the basic routines that help to transfer information between elements within the computing system environment 800, such as during start-up, may be stored in ROM 808. Similarly, RAN1 810, hard drive 818, and/or peripheral memory devices may be used to store computer executable instructions comprising an operating system 826, one or more applications programs 828, other program modules 830, and/or program data 832. Still further, computer-executable instructions may be downloaded to the computing environment 800 as needed, for example, via a network connection. The applications programs 828 may include, for example, a browser, including a particular browser application and version, which browser application and version may be relevant to determinations of correspondence between communications and user URL requests, as described herein. Similarly, the operating system 826 and its version may be relevant to determinations of correspondence between communications and user URL requests, as described herein.

An end-user may enter commands and information into the computing system environment 800 through input devices such as a keyboard 834 and/or a pointing device 836. While not illustrated, other input devices may include a microphone, a joystick, a game pad, a scanner, etc. These and other input devices would typically be connected to the processing unit 802 by means of a peripheral interface 838 which, in turn, would be coupled to bus 806. Input devices may be directly or indirectly connected to processor 802 via interfaces such as, for example, a parallel port, game port, firewire, or a universal serial bus (USB). To view information from the computing system environment 800, a monitor 840 or other type of display device may also be connected to bus 806 via an interface, such as via video adapter 842. In addition to the monitor 840, the computing system environment 800 may also include other peripheral output devices, not shown, such as speakers and printers.

The computing system environment 800 may also utilize logical connections to one or more computing system environments. Communications between the computing system environment 800 and the remote computing system environment may be exchanged via a further processing device, such a network router 842, that is responsible for network routing. Communications with the network router 842 may be performed via a network interface component 844. Thus, within such a networked environment, e.g., the Internet, World Wide Web, LAN, or other like type of wired or wireless network, it will be appreciated that program modules depicted relative to the computing system environment 800, or portions thereof, may be stored in the memory storage device(s) of the computing system environment 800.

The computing system environment 800 may also include localization hardware 846 for determining a location of the computing system environment 800. In embodiments, the localization hardware 846 may include, for example only, a GPS antenna, an RFID chip or reader, a WiFi antenna, or other computing hardware that may be used to capture or transmit signals that may be used to determine the location of the computing system environment 800. Data from the localization hardware 846 may be included in a callback request or other user computing device metadata in the methods of this disclosure.

The computing system, or one or more portions thereof, may embody a user computing device 108, in some embodiments. Additionally or alternatively, some components of the computing system 800 may embody the node labelling system 102. For example, the functional modules 116, 118, 120, 122, 124, 126 may be embodied as program modules 830.

In a first aspect of the present disclosure, a system is provided. The system includes a processor and a non-transitory computer-readable medium having stored thereon computer-executable instructions that are executable by the processor to cause the system to perform operations. The operations include determining, for each of a plurality of text bounding boxes in a document, respective text, respective coordinates, and respective input embeddings, generating a graph of the plurality of text bounding boxes according to the respective coordinates of the plurality of text bounding boxes, the graph including a plurality of nodes, each node representative of a respective text bounding box, and a plurality of connections, each connection of the plurality of connections including a first respective node, a second respective node, and zero or more respective intermediate nodes that are between the first and second respective nodes, determining a respective attention value for each connection of the plurality of connections according to a respective quantity of intermediate text bounding boxes in the respective connection, based on the attention values and a transformer-based machine learning model applied to the respective input embeddings and respective coordinates, determining respective output embeddings for each respective text bounding box, and based on the respective output embeddings, generating a respective bounding box label for each bounding box.

In an embodiment of the first aspect, determining respective text and respective coordinates for each text bounding box includes applying optical character recognition to the document.

In an embodiment of the first aspect, determining respective input embeddings for each text bounding box includes applying a sentence transformer to the respective text of the text bounding box.

In an embodiment of the first aspect, determining a respective attention value for each connection of the plurality of connections is further according to a Euclidean distance between the first and second text bounding boxes of the connection.

In an embodiment of the first aspect, determining a respective attention value for each connection of the plurality of connections according to a respective quantity of intermediate text bounding boxes in the respective connection includes assigning an attention value of zero to connections having more than a predetermined threshold of respective intermediate text bounding boxes.

In an embodiment of the first aspect, generating a respective text bounding box label for each text bounding box includes selecting the text bounding box label from a predetermined list of bounding box labels.

In an embodiment of the first aspect, the transformer-based machine learning model includes a plurality of layers, wherein determining respective output embeddings for each respective text bounding box includes calculating, for each respective text bounding box at each of one or more of the plurality of layers, a weighted sum of respective values of other text bounding boxes of the plurality of bounding boxes, wherein the weighted sum includes weights according to the respective attention values.

In an embodiment of the first aspect, the operations further include, according to the respective bounding box label and the respective text for one or more of the plurality of text bounding boxes: automatically validating an entity associated with the document; automatically approving a transaction associated with the document; or automatically populating a second document with the respective text of the one or more of the plurality of the bounding boxes, wherein the document is a first document.

In a second aspect of the present disclosure, a computer-implemented method is provided. The method includes receiving, by a processor, a document associated with a user, determining, by the processor, a plurality of text bounding boxes in the document, each text bounding box having respective text and a respective position, calculating, by the processor, for each text bounding box, respective input embeddings, defining, by the processor, a graph of the plurality of text bounding boxes according to the respective positions of the plurality of text bounding boxes, the graph including a plurality of nodes, each node representative of a respective text bounding box, and a plurality of connections, each connection of the plurality of connections including a first respective node, a second respective node, and a hop distance from the first respective node to the second respective node, determining a respective attention value for each connection of the plurality of connections according to a respective hop distance of the respective connection, based on the attention values and a machine learning model applied to the respective input embeddings, respective coordinates, and respective attention values, determining respective output embeddings for each respective text bounding box, and based on the respective output embeddings: automatically validating, by the processor, an entity associated with the document; automatically approving, by the processor, a transaction associated with the document; or automatically populating, by the processor, a second document with the respective text of the one or more of the plurality of the bounding boxes, wherein the document is a first document.

In an embodiment of the second aspect, the attention values are determined by the machine learning model.

In an embodiment of the second aspect, determining a respective attention value for each connection of the plurality of connections is further according to one or more of: a Euclidean distance from the first respective text bounding box to the second respective text bounding box; an interaction of the respective text of the first respective text bounding box to the respective text of the second respective text bounding box; a relationship of the respective text of the first respective text bounding box or the second respective text bounding box to the respective hop distance from the first respective text bounding box to the second respective text bounding box; or a relationship of the respective text of the first respective text bounding box or the second respective text bounding box to the respective Euclidean distance from the first respective text bounding box to the second respective text bounding box.

In an embodiment of the second aspect, determining a respective attention value for each connection of the plurality of connections according to a respective hop distance of the respective connection includes assigning an attention value of zero to connections having a respective hop distance greater than a predetermined threshold.

In an embodiment of the second aspect, the method further includes generating a respective bounding box label for each bounding box by selecting the bounding box label from a predetermined list of bounding box labels.

In an embodiment of the second aspect, selecting the bounding box labels from a predetermined list of bounding box labels includes performing combinatorial matching.

In an embodiment of the second aspect, the machine learning model is transformer-based.

In a third aspect of the present disclosure, a computer-implemented method is provided. The method includes determining, by a processor, a graph of a plurality of nodes, the graph including a plurality of connections, the graph respective of a digital information set, wherein each connection includes a first respective node, a second respective node, and zero or more respective intermediate nodes between the first and second respective nodes of the connection and each node of the plurality of nodes includes respective content and respective coordinates. The method further includes determining, by the processor, respective input embeddings for each node of the plurality of nodes, determining, by the processor, a respective attention value for each connection of the plurality of connections according to a respective quantity of intermediate nodes in the respective connection, based on the attention values and a transformer-based machine learning model applied to the respective input embeddings and the respective coordinates, determining, by the processor, respective output embeddings for each respective node, and based on the respective output embeddings, generating, by the processor, a respective label for each node.

In an embodiment of the third aspect, determining a respective attention value for each connection of the plurality of connections according to a respective quantity of intermediate nodes in the respective connection includes assigning an attention value of zero to connections having more than a predetermined threshold of respective intermediate nodes.

In an embodiment of the third aspect, the information set includes a document, and the nodes include bounding boxes on the document.

In an embodiment of the third aspect, generating a respective label for each node includes selecting a label from a predetermined set of possible labels.

In an embodiment of the third aspect, the method further includes, according to the respective label for at least one of the plurality of nodes: automatically validating, by the processor, an entity associated with the digital information set; automatically approving, by the processor, a transaction associated with the digital information set; or automatically populating, by the processor, a document with text associated with the at least one of the plurality of nodes.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A system, comprising:
 a processor; and
 a non-transitory computer-readable medium having stored thereon computer-executable instructions that are executable by the processor to cause the system to perform operations comprising:
  determining, for each of a plurality of text bounding boxes in a document, respective text, respective coordinates, and respective input embeddings;
  generating a graph of the plurality of text bounding boxes according to the respective coordinates of the plurality of text bounding boxes, the graph comprising a plurality of nodes, each node representative of a respective text bounding box, and a plurality of connections, each connection of the plurality of connections comprising a first respective node, a second respective node, and zero or more respective intermediate nodes that are between the first and second respective nodes;

determining a respective attention value for each connection of the plurality of connections according to a respective quantity of intermediate text bounding boxes in the respective connection;

based on the attention values and a transformer-based machine learning model applied to the respective input embeddings and respective coordinates, determining respective output embeddings for each respective text bounding box; and based on the respective output embeddings, generating a respective bounding box label for each bounding box.

2. The system of claim 1, wherein determining respective text and respective coordinates for each text bounding box comprises applying optical character recognition to the document.

3. The system of claim 1, wherein determining respective input embeddings for each text bounding box comprises applying a sentence transformer to the respective text of the text bounding box.

4. The system of claim 1, wherein determining a respective attention value for each connection of the plurality of connections is further according to a Euclidean distance between the first and second text bounding boxes of the connection.

5. The system of claim 1, wherein determining a respective attention value for each connection of the plurality of connections according to a respective quantity of intermediate text bounding boxes in the respective connection comprises assigning an attention value of zero to connections having more than a predetermined threshold of respective intermediate text bounding boxes.

6. The system of claim 1, wherein generating a respective text bounding box label for each text bounding box comprises selecting the text bounding box label from a predetermined list of bounding box labels.

7. The system of claim 1, wherein the transformer-based machine learning model comprises a plurality of layers, wherein determining respective output embeddings for each respective text bounding box comprises calculating, for each respective text bounding box at each of one or more of the plurality of layers, a weighted sum of respective values of other text bounding boxes of the plurality of bounding boxes, wherein the weighted sum comprises weights according to the respective attention values.

8. The system of claim 1, wherein the operations further comprise, according to the respective bounding box label and the respective text for one or more of the plurality of text bounding boxes:

automatically validating an entity associated with the document;

automatically approving a transaction associated with the document; or automatically populating a second document with the respective text of the one or more of the plurality of the bounding boxes, wherein the document is a first document.

9. A computer-implemented method comprising:

receiving, by a processor, a document associated with a user;

determining, by the processor, a plurality of text bounding boxes in the document, each text bounding box having respective text and a respective position;

calculating, by the processor, for each text bounding box, respective input embeddings;

defining, by the processor, a graph of the plurality of text bounding boxes according to the respective positions of the plurality of text bounding boxes, the graph comprising a plurality of nodes, each node representative of a respective text bounding box, and a plurality of connections, each connection of the plurality of connections comprising a first respective node, a second respective node, and a hop distance from the first respective node to the second respective node;

determining a respective attention value for each connection of the plurality of connections according to a respective hop distance of the respective connection;

based on the attention values and a machine learning model applied to the respective input embeddings, respective coordinates, and respective attention values, determining respective output embeddings for each respective text bounding box; and based on the respective output embeddings:

automatically validating, by the processor, an entity associated with the document;

automatically approving, by the processor, a transaction associated with the document; or automatically populating, by the processor, a second document with the respective text of the one or more of the plurality of the bounding boxes, wherein the document is a first document.

10. The computer-implemented method of claim 9, wherein the attention values are determined by the machine learning model.

11. The computer-implemented method of claim 9, wherein determining a respective attention value for each connection of the plurality of connections is further according to one or more of:

a Euclidean distance from the first respective text bounding box to the second respective text bounding box;

an interaction of the respective text of the first respective text bounding box to the respective text of the second respective text bounding box;

a relationship of the respective text of the first respective text bounding box or the second respective text bounding box to the respective hop distance from the first respective text bounding box to the second respective text bounding box; or a relationship of the respective text of the first respective text bounding box or the second respective text bounding box to the respective Euclidean distance from the first respective text bounding box to the second respective text bounding box.

12. The computer-implemented method of claim 9, wherein determining a respective attention value for each connection of the plurality of connections according to a respective hop distance of the respective connection comprises assigning an attention value of zero to connections having a respective hop distance greater than a predetermined threshold.

13. The computer-implemented method of claim 9, further comprising generating a respective bounding box label for each bounding box by selecting the bounding box label from a predetermined list of bounding box labels.

14. The computer-implemented method of claim 9, wherein selecting the bounding box labels from a predetermined list of bounding box labels comprises performing combinatorial matching.

15. The computer-implemented method of claim 9, wherein the machine learning model is transformer-based.

16. A computer-implemented method comprising:
- determining, by a processor, a graph of a plurality of nodes, the graph comprising a plurality of connections, the graph respective of a digital information set, wherein:
  - each connection comprises a first respective node, a second respective node, and zero or more respective intermediate nodes between the first and second respective nodes of the connection; and
  - each node of the plurality of nodes comprises respective content and respective coordinates;
- determining, by the processor, respective input embeddings for each node of the plurality of nodes;
- determining, by the processor, a respective attention value for each connection of the plurality of connections according to a respective quantity of intermediate nodes in the respective connection;
- based on the attention values and a transformer-based machine learning model applied to the respective input embeddings and the respective coordinates, determining, by the processor, respective output embeddings for each respective node; and
- based on the respective output embeddings, generating, by the processor, a respective label for each node.

17. The computer-implemented method of claim 16, wherein determining a respective attention value for each connection of the plurality of connections according to a respective quantity of intermediate nodes in the respective connection comprises assigning an attention value of zero to connections having more than a predetermined threshold of respective intermediate nodes.

18. The computer-implemented method of claim 16, wherein the information set comprises a document, and the nodes comprise bounding boxes on the document.

19. The computer-implemented method of claim 16, wherein generating a respective label for each node comprises selecting a label from a predetermined set of possible labels.

20. The computer-implemented method of claim 16, further comprising, according to the respective label for at least one of the plurality of nodes:
- automatically validating, by the processor, an entity associated with the digital information set;
- automatically approving, by the processor, a transaction associated with the digital information set; or
- automatically populating, by the processor, a document with text associated with the at least one of the plurality of nodes.

\* \* \* \* \*